() United States Patent  
Staab et al.

(10) Patent No.: US 11,465,653 B2  
(45) Date of Patent: Oct. 11, 2022

(54) UNMANNED RAIL VEHICLE

(71) Applicant: ABB Schweiz AG, Baden (CH)

(72) Inventors: Harald Staab, Manchester, CT (US); William Eakins, Bloomfield, CT (US); Daniel Lasko, Bloomfield, CT (US); Thomas Fuhlbrigge, Ellington, CT (US); Edward Zhang, Sunnyvale, CA (US); Harshang Shah, Bloomfield, CT (US); Stefan Rakuff, Windsor, CT (US); Gregory Cole, West Hartford, CT (US); Gregory Rossano, Enfield, CT (US); Andrew Salm, West Hartford, CT (US); Sang Choi, Simsbury, CT (US); Remus Boca, Simsbury, CT (US)

(73) Assignee: ABB Schweiz AG, Baden (CH)

( * ) Notice: Subject to any disclaimer, the term of this patent is extended or adjusted under 35 U.S.C. 154(b) by 492 days.

(21) Appl. No.: 16/467,795

(22) PCT Filed: Dec. 8, 2017

(86) PCT No.: PCT/EP2017/081980  
§ 371 (c)(1),  
(2) Date: Jun. 7, 2019

(87) PCT Pub. No.: WO2018/104504  
PCT Pub. Date: Jun. 14, 2018

(65) Prior Publication Data  
US 2019/0322292 A1 Oct. 24, 2019

Related U.S. Application Data

(60) Provisional application No. 62/431,680, filed on Dec. 8, 2016.

(30) Foreign Application Priority Data

Feb. 8, 2017 (EP) ................................. 17155123

(51) Int. Cl.  
*B61B 3/02* (2006.01)  
*B61C 3/00* (2006.01)  
(Continued)

(52) U.S. Cl.  
CPC ................. *B61B 3/02* (2013.01); *B61C 3/00* (2013.01); *B61C 13/04* (2013.01); *B61C 17/06* (2013.01); *B61D 15/00* (2013.01); *B61L 27/70* (2022.01)

(58) Field of Classification Search  
CPC .. B61B 3/02; B61C 3/00; B61C 13/04; B61C 17/06; B61D 15/00; B61L 27/0005  
See application file for complete search history.

(56) References Cited

U.S. PATENT DOCUMENTS 3,774,547 A * 11/1973 Widiger ................. B61D 11/00  
104/244  
4,000,702 A 1/1977 Mackintosh  
5,351,621 A 10/1994 Tanaka et al.

FOREIGN PATENT DOCUMENTS

CL 58836 4/2016  
CN 1445125 A 10/2003  
(Continued)

OTHER PUBLICATIONS

Chilean Office Action; Application No. 201901563; dated Jan. 27, 2021; 19 Pages.  
(Continued)

*Primary Examiner* — Robert J McCarry, Jr.  
(74) *Attorney, Agent, or Firm* — Whitmyer IP Group LLC

(57) ABSTRACT

An unmanned rail vehicle for surveillance, inspection, and/or maintenance of an industrial site is provided. The rail vehicle includes at least two carry rollers adapted for engaging on an upper rail side of a rail, wherein the center of gravity of the rail vehicle is vertically below the upper rail  
(Continued)

side; and at least one support roller connected to the chassis and adapted for rolling against a lateral rail side of the rail to laterally displace the center of gravity of the rail vehicle with respect to the upper rail side.

20 Claims, 6 Drawing Sheets

(51) Int. Cl.
*B61C 13/04* (2006.01)
*B61C 17/06* (2006.01)
*B61D 15/00* (2006.01)
*B61L 27/70* (2022.01)

(56) References Cited

FOREIGN PATENT DOCUMENTS

| | | |
|---|---|---|
| CN | 1468183 A | 1/2004 |
| CN | 102310861 A | 1/2012 |
| CN | 202430162 U | 9/2012 |
| DE | 3611125 A1 | 10/1987 |
| JP | H0281766 A | 3/1990 |
| WO | 2010040226 A1 | 4/2010 |
| WO | WO-2010040226 A1 * 4/2010 .............. B60M 7/00 |
| WO | WO-2010040266 A1 * 4/2010 ......... H04N 21/4788 |

OTHER PUBLICATIONS

European Search Report Application No. EP 17 15 5123 Completed: Aug. 1, 2017;dated Aug. 16, 2017 7 pages.
International Preliminary Report on Patentability Application No. PCT/EP2017/081980 dated Mar. 11, 2019 14 pages.
International Search Report and Written Opinion of the International Searching Authority Application No. PCT/EP2017/081980 Completed: Apr. 9, 2018; dated Apr. 18, 2018 14 pages.
Written Opinion of the International Searching Authority Application No. PCT/EP2017/081980 dated Nov. 23, 2018 5 pages.
Chilean Office Action; Application No. 201901563; dated Aug. 4, 2020; 22 Pages.
Chinese Office Action with Translation Application No. 2017800760317 dated Apr. 13, 2020 9 pages.
Chinese Office Action and Translation Application No. 2017800760317 Completed on: Nov. 11, 2019 8 pages.
Chinese Search Report Application No. 2017800760317 Completed on: Nov. 1, 2019 3 pages.
Indian Office Action with Translation; Application No. 201947026445; dated Mar. 10, 2021; 7 Pages.
Brazilian Office Action; Application No. BR1120190104224; dated Oct. 16, 2021; 7 Pages.

* cited by examiner

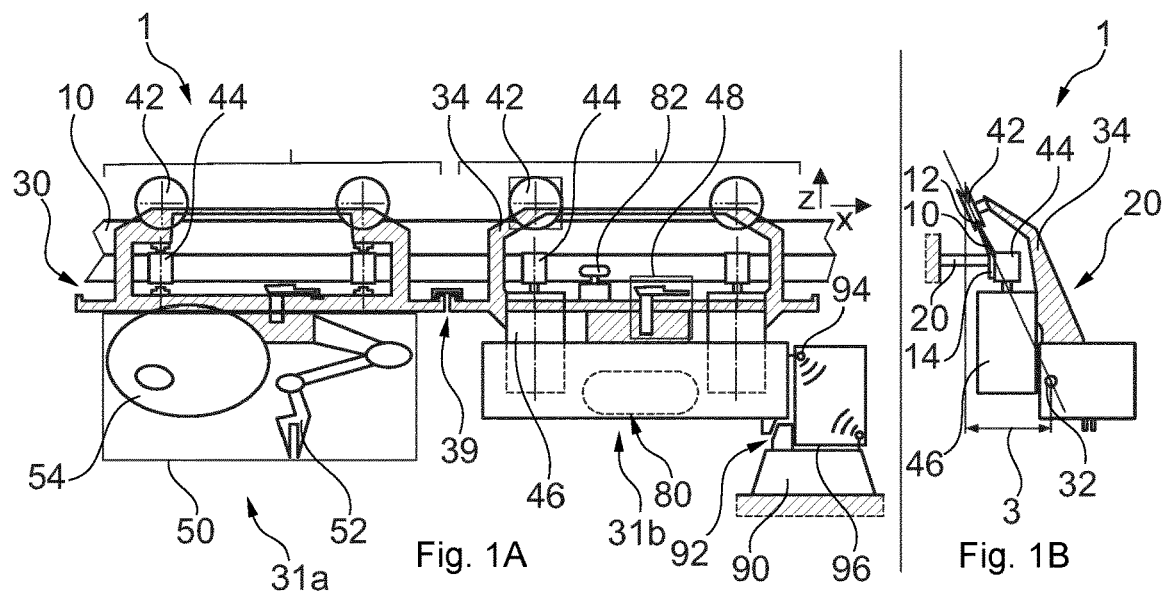
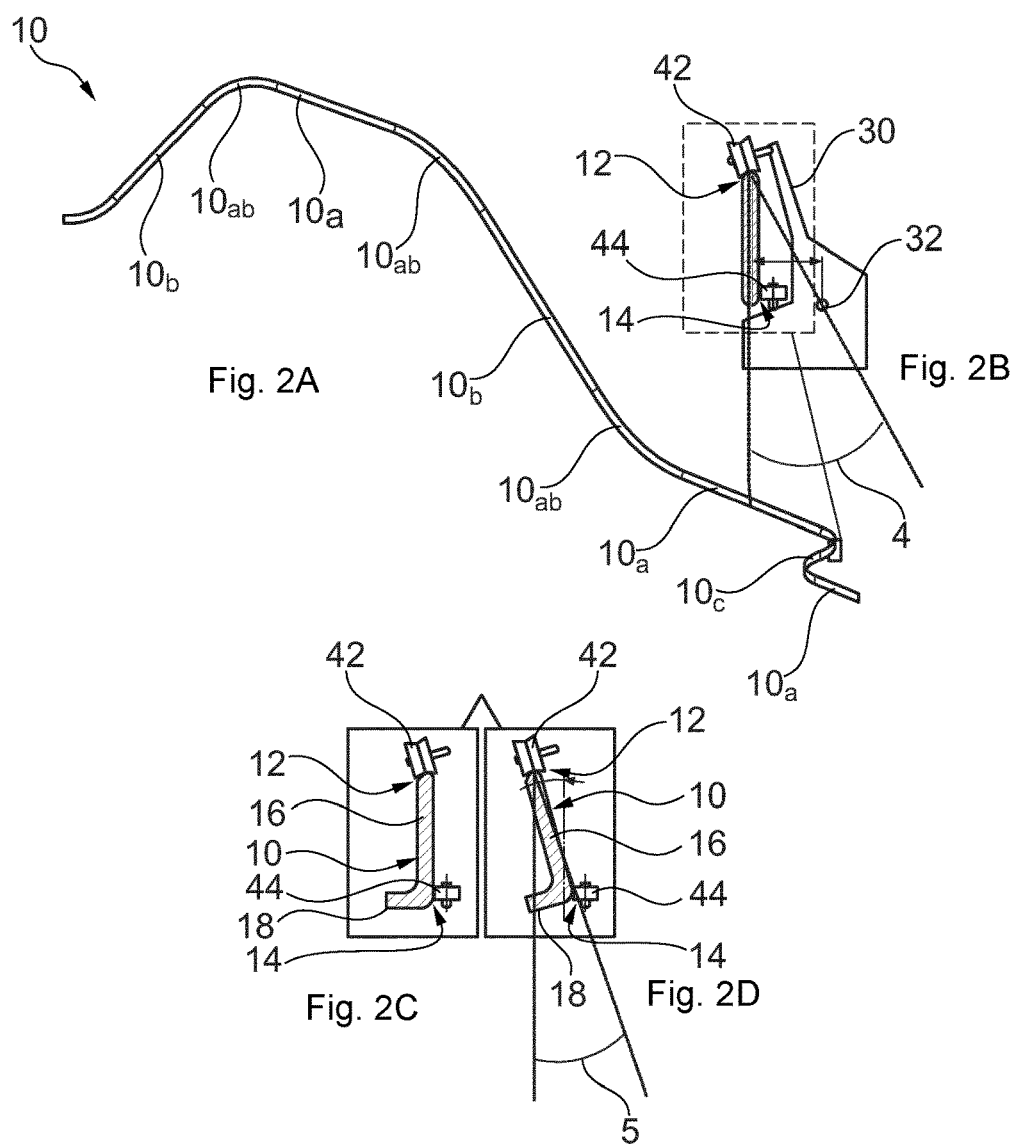

UNMANNED RAIL VEHICLE

TECHNICAL FIELD

An aspect of the present invention relates to an unmanned rail vehicle for surveillance, inspection, and/or maintenance of an industrial site. According to an aspect, the unmanned rail vehicle has a chassis and a functional module for carrying out the surveillance, inspection, and/or maintenance of the industrial site. An aspect of the present invention also relates to a rail vehicle system including a rail, a vehicle and possibly a base station.

BACKGROUND

There is a general need to do regular inspection of industrial assets and properties for various purposes, such as security, equipment monitoring, and maintenance. It is common practice in many cases that regular inspection tours or patrols are carried out by personnel. However, it would sometimes be beneficial to automate such regular activities without the need to send personnel throughout spacious industrial sites. Possible advantages of automation include not exposing personnel to on-site hazards, costs savings, and/or better consistency in the quality of inspection results.

An apparatus for monitoring a conveyor belt installation is, for example, described in DE 3611125 A1. The apparatus is unmanned and is guided on or adjacent to a conveyor belt supporting frame of the belt installation. Thereby, the apparatus can be moved over the length of the conveyor belt. The apparatus has a camera system and other sensors. Thereby it becomes possible to determine damage to the conveyor belt installation.

However, such known apparatuses require considerable space, and in some circumstances may even be impossible to install due to spatial constraints. Further, the apparatus is costly and complicated to install, especially if a reliable operation is important.

SUMMARY

Aspects of the present invention aim to reduce some of the above-mentioned drawbacks at least partially.

According to an aspect of the invention, an unmanned rail vehicle for surveillance, inspection, and/or maintenance of an industrial site, a rail vehicle system for surveillance, inspection, and/or maintenance of an industrial site, and a use are provided. Further advantages, features, aspects and details that can be combined with embodiments described herein are evident from the dependent claims, the description and the drawings.

In the following, some preferred aspects of the invention are described. It is understood that each aspect can be combined with any other aspect or individual feature of an embodiment described herein.

The industrial site may be located separated from inhabitable land, be dangerous or difficult to access by humans. Examples of an industrial site include a petrochemical plant, a mine, an electric switchyard, a solar power plant, a wind power plant, a harbor, an ocean vessel, a factory, and a warehouse.

The rail vehicle includes a (at least one) chassis, and at least two carry rollers connected (directly without intermediate moving parts, except for the wheel bearing, or indirectly through other non-rigid parts such as a suspension element) to the chassis. The chassis may be rigid or non-rigid.

The carry rollers are adapted for engaging on an upper rail side of a rail and for moving the rail vehicle along the rail (e.g., by the carry rollers rolling along the upper rail side while being guided by the upper rail side). The center of gravity of the rail vehicle is vertically (i.e., when projected onto the vertical axis) below the upper rail side. Preferably the carry rollers are placed for collectively carrying, during operation on a rail, more than 50% of the weight of the rail vehicle, preferably more than 60% or even more than 75% of the weight.

The rail vehicle further includes at least one support roller connected (directly or indirectly) to the chassis. The support roller is adapted for rolling against a lateral rail side of the rail to laterally displace the center of gravity of the rail vehicle with respect to the upper rail side (so that the center of gravity is laterally displaced from the upper rail side when both are projected onto a horizontal plane). The rail vehicle further includes a functional module for carrying out the surveillance, inspection, and/or maintenance of the industrial site, such as petrochemical plants, mines, electric switchyards, solar and wind power plants, harbors, ocean vessels, factories, and warehouses.

The rail vehicle system comprises a rail vehicle as described herein, and a rail (e.g., monorail) along which the rail vehicle can move. By providing such a system, the problem of reliable navigation is vastly reduced because the rail vehicle reliably stays on track. On the other hand, the rail system is kept simple to install and therefore remains cost-effective.

By the displacement of the vehicle's center of gravity, it is ensured that the support roller is pressed, by the rail vehicle's weight, against the lateral rail side. Thereby, the rail vehicle is stably held in a well-defined position relative to the rail, even in harsh conditions such as outdoors. If the support roller acts as a traction roller, a sufficient traction pressure is ensured as well. These advantages are achieved with a small footprint and at low cost. Thus, improved cost efficiency and/or improved reliability are made possible.

The rail vehicle further comprises a terminal being connectable to a port of a base station of the rail vehicle system. The base station is typically stationary and arranged in proximity to the rail, so as to allow connection to the terminal of the rail vehicle. The rail vehicle's terminal is adapted for transmitting electrical power to a power source of the rail vehicle for charging the rail vehicle. The terminal thus facilitates the autonomous propulsion of the rail vehicle. Also, a plurality of base stations may be provided. The base station is generally located at a discrete position or a plurality of discrete positions along the rail and is therefore different from a continuous power line along the rail. Alternatively or additionally, the terminal is adapted for transmitting data (e.g., status data, instruction data, and/or data indicating a sensor measurement or other inspection result) between the base station and a control unit of the rail vehicle.

Thus, aspects of the invention enable a small unmanned rail vehicle travelling on a monorail stably and in a space- and cost-saving manner. The rail vehicle may carry devices for surveillance, inspection, and/or maintenance of the industrial site.

Herein, unless stated otherwise, all quantities depending on the orientation of the rail assume that the rail vehicle is placed on a horizontal rail, unless stated otherwise. Preferably, the quantities are also valid for any rail having any slope of less than 15°, preferably for any rail having any slope of less than 30° with respect to the horizontal.

BRIEF DESCRIPTION OF THE DRAWINGS

The details will be described in the following with reference to the figures, wherein FIGS. 1A-1B are a side view and a cross-sectional view, respectively, of a rail vehicle system according to an embodiment of the invention;

FIG. 2A is a perspective view of a rail of a rail vehicle system according to an embodiment of the invention; FIG. 2B is a cross-sectional view of a rail vehicle system according to an embodiment of the invention; and FIGS. 2C to 2D are cross-sectional views of rails according to alternative embodiments;

DETAILED DESCRIPTION

Figures 3A, 3B, 3C, 3D, 3E, 3F, 3G:
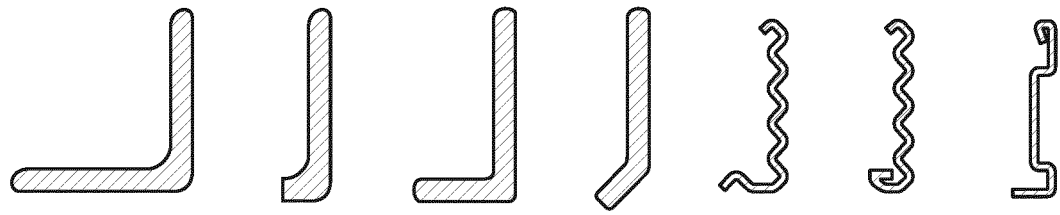
FIGS. 3A to 3G are cross-sectional views of rails according to further alternative embodiments.

Reference will now be made in detail to the various embodiments, which are illustrated in the figures. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment applies to a corresponding part or aspect in another embodiment as well.

In FIGS. 1a and 1b, an unmanned rail vehicle system 1 according to the invention is shown. FIG. 1 shows a side view and FIG. 1b shows a cross-sectional view.

The rail vehicle system 1 comprises a rail 10, a rail vehicle 30 adapted for travelling in a lengthwise direction (left to right in FIG. 1a) along the rail 10, and a base station 90. The rail vehicle 30 has two rail cars 31a and 31b, connected by means of a coupling 39 to form a rail vehicle train, with a self-propelled locomotive (car 31b) with a traction system and a coach (car 31a) with process equipment 50. The coupling 39 transmits push and pull forces and allow the train to go through horizontal and vertical curves. The car 31a or 31b itself can also be regarded as a rail vehicle.

Each one of the cars 31a, 31b has a rigid frame or chassis 34; also all chasses 34 and the coupling(s) 39 therebetween can be regarded as a chassis. To the chassis 34 are attached carry rollers 42 having a groove along their outer circumference. The groove engages on an upper rail side 12 of the rail 10 (upper edge of the rail). Due to this engagement, the carry rollers 42 ride on the upper side of the rail and that carry the weight of the vehicle, and also guide the rail vehicle 30 along the rail 10, regardless of whether the track is straight or curved.

In addition, the rail vehicle 30 has support rollers 44 connected to the chassis 34. The support rollers 44 ride on a lateral rail side 14 of the rail 10 (opposite to the mount 20).

The rail vehicle's center of gravity 32 is below the upper side 12 of the rail 10. Thereby, the engagement of the groove on the upper rail side 12 is stabilized by the rail vehicle's weight. Further, the rail vehicle's center of gravity 32 is laterally offset or displaced with respect to the rail 10 (e.g., with respect to the vertical line through the upper side 12 in FIG. 1b). This lateral displacement is a result of the two support rollers 44 pushing the rail vehicle 30 sideways due to a vertical force component exerted by the rollers 34 on the lateral rail side 14. Herein, any statement about the rail vehicle's 30 center of gravity 32 may also be applied to any single car 31, 31b of the rail vehicle, or to all cars.

The rail vehicle, and more specifically the car 31a, has a functional module 50 including process equipment for carrying out the surveillance, inspection, and/or maintenance of the industrial site. The functional module 50 has, as process equipment, a manipulator 52 and a camera 54.

The rail vehicle, and more specifically the car 31b, has a traction system including an electric traction motor 46 that acts on the support rollers 44. Thereby, the rail vehicle 30 is self-propelled. The carry rollers 42 are idling. Also, the rollers 42, 44 of the car 31a are idling. The car 31b further includes an actuated brake system 48 that acts on the rail 10.

The car 31b has a position sensor 82 for measuring travel distance or position along the track, and a control unit 80 operatively coupled to the position sensor 82, to the electric traction motor 46 and to the actuated brake system 48 for registering the position and controlling movement of the vehicle 30. The control unit 80 is also operatively coupled to the functional module 50 for carrying out the surveillance, inspection, and/or maintenance tasks.

Further, the rail vehicle 30 has a rechargeable power source (not shown) operatively connected to the various power-consuming parts of the rail vehicle 30.

In an alternative embodiment, the train consisting of cars 31a, 31b can also be provided as a single car, having a single rigid body 34 without coupling 39, and having any number of carry wheels (e.g., 2 or 4 or 8 carry wheels) and any number of support wheels (e.g., 1 or 2 or 4 or 8 support wheels).

Further, in the embodiment of FIG. 1a, a stationary base station 90 is provided, for recharging the rail vehicle's power source and/or for exchanging data with the rail vehicle 30. To this purpose, the rail vehicle 30 has a charging terminal 92 connectable to a power port of the base station 90 for transmitting electrical power from the base station to the rail vehicle's power source. In this embodiment, the charging terminal 92 and/or the power port have blade-shaped power source charging contacts, and have a mechanical guide allowing the vehicle 30 to drive into and out of the contacts with its own propulsion. Further, the rail vehicle 30 has a data terminal 94 connectable to a data port 96 of the base station 90 for transmitting data between the base station 90 and the rail vehicle's control unit 80. The data terminal 94 may be integrated with the charging terminal 92, may be coupled via the rail 10 for transmitting data over a distance, or may be wireless.

Figure 12:
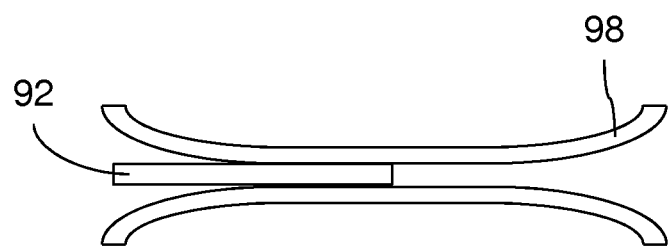
FIG. 12 is a cross-sectional view of a charging terminal of a rail vehicle and a power port of a base station according to a further embodiment of the invention.

FIG. 12 shows a possible implementation of the rail vehicle's charging terminal 92 and the power port 98 of the base station 90. Here, the charging terminal 92 has a blade-shaped charging contact, and the power port 98 has two contact portions facing each other for contacting the charging contact therebetween. The power port 98 further has a mechanical guide allowing the vehicle 30 to drive into and out of the contacts with its own propulsion whereby the charging contact is securely positioned with respect to the power port 98. In the embodiment of FIG. 12, the mechanical guide is implemented as chamfered entry sections at both entry portions to the region between the two contact portions. These chamfered entry sections allow the contacts to align with the blade contacts of the vehicle when the vehicle docks for charging. Further, the charge contact 98 is mounted on a flexible rubber part for further improving the alignment. Further possible details of the base station are described in the section "General aspects of the invention" below.

The charging terminal and power port may comprise a plurality of charging contacts/contact portions as shown in FIG. 12. Further, alternatively or additionally, the data terminal 94 may be implemented in the same manner as described herein for the charging terminal. Also, the charging terminal and power port may be an integrated charging and data terminal and port for both charging and data transmission through the same contacts.

Returning to the description of FIG. 1, the rail 10 extends in a lengthwise direction (from left to right in FIG. 1*a*). The rail has an upper rail side 12 engaging with the carry rollers 42, and a lateral rail side 14 supporting the support rollers 44, thereby laterally displacing the center of gravity 32 of the rail vehicle 30 as described above. The upper rail side 12 is an upper rim on which the carry rollers 42 roll along the lengthwise direction.

Figure 6:
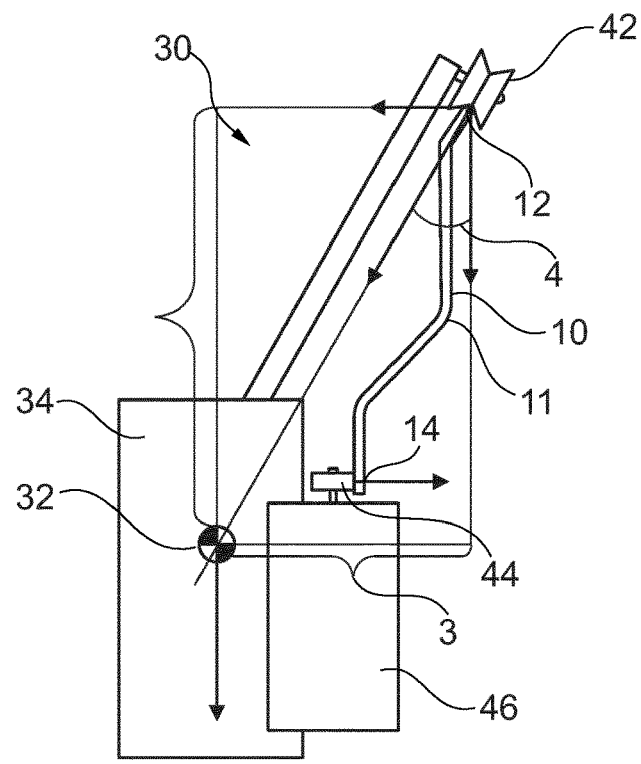
FIGS. 6 and 7 are a cross-sectional view and a side view, respectively, of a rail vehicle system according to a further embodiment of the invention.
Figure 7:
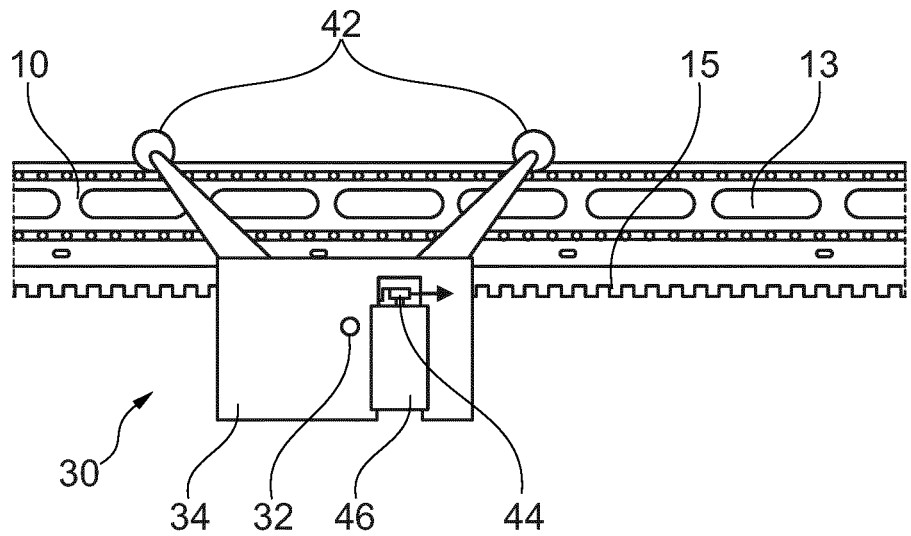

Further details of the rail vehicle 30 are described with reference to FIGS. 6 and 7. FIG. 6 shows the cross-sectional profile of the rail 10 and the vehicle 30, and FIG. 7 shows a side view thereof.

The rail 10 comprises a steel band. In order to save material but still being rigid enough to support itself and the vehicle, the rail cross-section has stiffening bends 11. FIG. 7 further illustrates some optional or alternative features of the rail 10, such as cut-outs 13 to reduce weight; a tooth structure 15 that allows drive traction and/or distance sensing of the vehicle by a rack and pinion mechanism; and further cutouts arranged at regular intervals as reference marks for the travel distance sensing of the vehicle.

The vehicle 30 comprises the vehicle body (chassis) 34. Attached to the chassis 34 are the carry rollers 42 and support rollers 44, the traction motor 46 connected to the support rollers 44 which creates the propulsion to move the vehicle along the rail. The traction wheel 24 produces traction forces either through positive locking (rack drive with the tooth structure 15 illustrated in FIG. 7) or through friction with the rail. Other details of the vehicle are analogous to the ones already described with reference to FIGS. 1*a* and 1*b*. For example, the vehicle 30 may comprise a functional module as described herein.

FIG. 6 also illustrates a diagram of forces, shown as fat arrows, acting from the vehicle 30 on various parts of the rail 10. This force diagram illustrates that the gravitational force acting on the center of gravity 32 of the vehicle is absorbed by the rail 10 through the carry rollers 42 (inclined arrow emerging from the carry rollers 42) and through the support rollers 44 (horizontal arrow emerging from the support rollers 44). The inclination of the force absorbed through the carry rollers 42 is given by the center-of-gravity angle 4, i.e., the angle between the vertical line below the upper rail side 12 and the straight line connecting the upper rail side 12 and the center of gravity 32 in FIG. 6. Thus, the magnitude of this angle governs the force by which the support rollers 44 press against the rail. It is preferred that the center-of-gravity angle 4 is between 5° and 30°.

The vehicle design described herein allows low friction rollers having only few contact points with the rail. This effect can be further improved by using the support roller 44 also as a traction wheel. In addition, this design is also very cost efficient because it reduces the number of functional components of the drivetrain. Furthermore this drivetrain design is tolerant to a certain level of inaccuracies of the rail such as bends in the rail, rust or deposits on the rail.

FIG. 2*a* shows a section of the rail 10 according to an embodiment. It shows horizontal rail segments 10*a*, inclined segments 10*b*, vertically curved segments 10*ab* to transition between the horizontal and inclined segments 10*a* and 10*b*, or horizontally curved segments 10*c*.

As shown in FIG. 2*a*, the rail includes individual rail segments. These rail segments are connected by connectors (such as a joining shape or joining elements) at both ends of each rail segment and form-fit to each other for joining the ends to one another for assembling multiple segments to a longer rail. For example, the connectors may include an aligning structure for align mating ends vertically and horizontally.

FIG. 2*b*, 2*c*, 2*d* show examples of cross-sectional shapes of rails 10 according to different embodiments: FIG. 2*b* shows a vertically straight cross-sectional shape. FIG. 2*c* shows a vertical L-shaped cross-section with the long leg being vertically oriented. FIG. 2*d* shows an inclined L-shaped cross-section with the long leg 16 being inclined with respect to the vertical.

Generally, an L-shape cross-section has the advantage of being easy to manufacture and providing flexural stability. Therefore, an L-shaped rail cross-section is preferred at least for straight or moderately curved rail sections. Preferably, the long leg 16 of the L-shape is pointing essentially upwards, and the short leg 18 is pointing horizontally or downwards at an angle. The vertically straight cross-sectional shape shown in FIG. 2*b*, in contrast, is preferred for horizontal curves with small radius.

In an alternative embodiment, the legs 16 and 18 may have equal length.

FIGS. 2*b* to 2*d* also show further details of the arrangement of the rail vehicle 30 according to embodiments. Namely, the center of gravity 32 is vertically below the upper edge 12 of the rail 10. As a consequence, the vehicle is hanging on the rail by means of the carrying wheels 42 that carry the weight of the vehicle stably even in the presence of lateral forces or perturbations.

The vehicle's center of gravity 32 is horizontally offset with respect to the upper edge 12 of the rail 10. The offset can be described in terms of a center-of-gravity angle 4, shown in FIG. 2*b*. The center-of-gravity angle being defined as the angle between the vertical line below the upper rail side 12 and the straight line connecting the upper rail side 12 and the center of gravity 32. Generally, the center-of-gravity angle is at least 5°, more preferably at least 10°, more preferably at least 20°, and even more preferably at least 30°.

Another way of describing the offset is a support-roller-contact angle 5, shown in FIG. 2*d*, the support-roller-contact angle being defined as the angle between the vertical line below the upper rail side 12 and the straight line connecting the upper rail side 12 and the lateral rail side portion 14 (the contact portion between the rail 10 and the support roller 44), in a cross-sectional plane orthogonal to the length direction of the rail 10. Generally, the support-roller-contact angle is at least 5°, more preferably at least 10°, more preferably at least 15°, and even more preferably at least 20°.

This offset is achieved by the support wheels 44 transmitting a horizontal force component to the rail portion 14 (see FIG. 6 below).

FIGS. 3a to 3g show further possible cross-sectional profiles of the rail 10 according to further embodiments. Different cross-sectional profiles can also be combined, in a single embodiment, for different sections of the rail 10. In FIGS. 3a to 3g, only orientations with vertical longer leg are shown; but as described above, the longer leg can also be inclined with respect to the vertical.

FIG. 3a shows an L-shape where both legs have the same length. FIG. 3b shows an L-shape with a very short shorter leg. FIG. 3c shows a profile with less rounded or chamfered edges. FIG. 3d shows an L-shape where the angle between the legs is around 135°.

FIGS. 3e, 3f and 3g show examples with thinner material and where additional stiffness is achieved with geometric features along the length: FIG. 3e shows an L-shape where the long leg and the short leg are stiffened with zig-zag shapes. FIG. 3f shows a similar design but with a back-folded short leg which increases stiffness around the buckle of the L. FIG. 3g shows an L-shape with 90° bends instead of zig-zag bends and where the upper rim is stiffened with a backfold. The zig-zag shaped cross section of the rail 10 increases the stiffness of the rail along its length while minimizing the amount of material of the rail. These are only a few examples of a large variety of possible L-shaped rails.

When the rail is curved about the vertical or the horizontal axes to follow a predetermined path (see rail sections 10ab and 10c in FIG. 2a), the rail's inclination—and thereby the offset as defined above—can change due to asymmetric bending stresses induced into the rail. To prevent these stresses, at such curved portions a modified profile section can be used that has lower bending stiffness about the vertical and horizontal axis, respectively, and that promotes symmetry in the developed stresses. Thereby, the inclination can be adjusted during installation of the rail.

The vehicles travelling on the rail have carrying wheels 42 that travel on the upper edge (upper rail side) 12 of the long leg 16 and support wheels 44 that travel on or close to the outside edge of the L-bend (lateral rail side). The upper edge 12 and/or the lateral rail side 14 may be rounded. The lateral rail side 14 may have a ribbing to increase traction or prevent slip.

Figure 4:
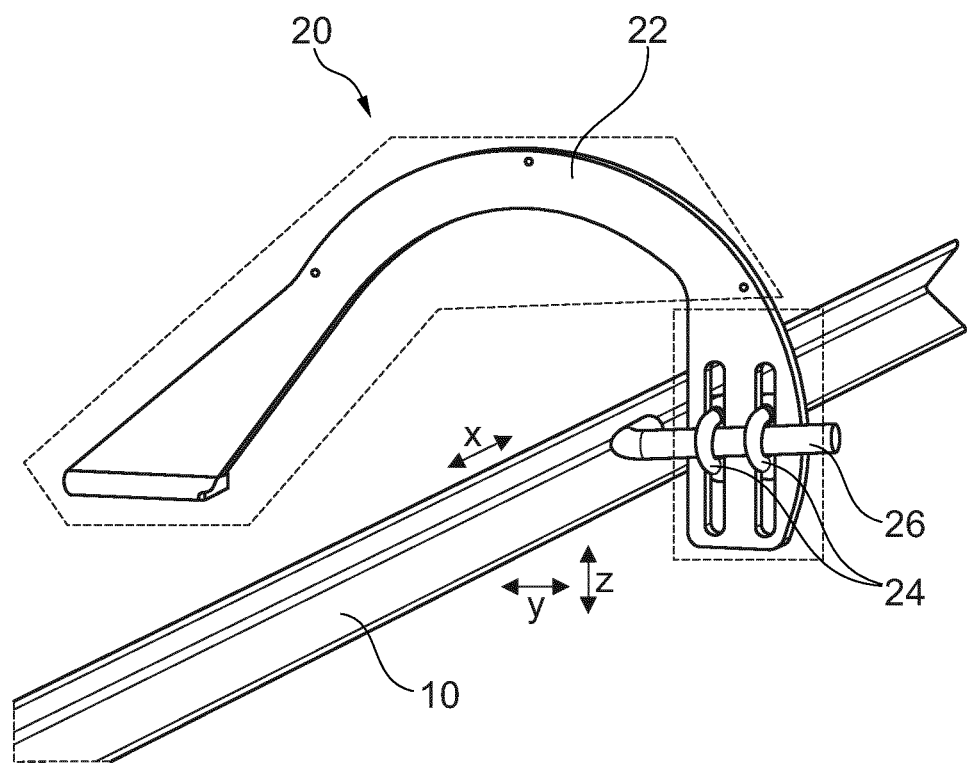
FIGS. 4 and 5 are perspective views of a rail according to a further embodiment, including a rail mount system.
Figure 5:
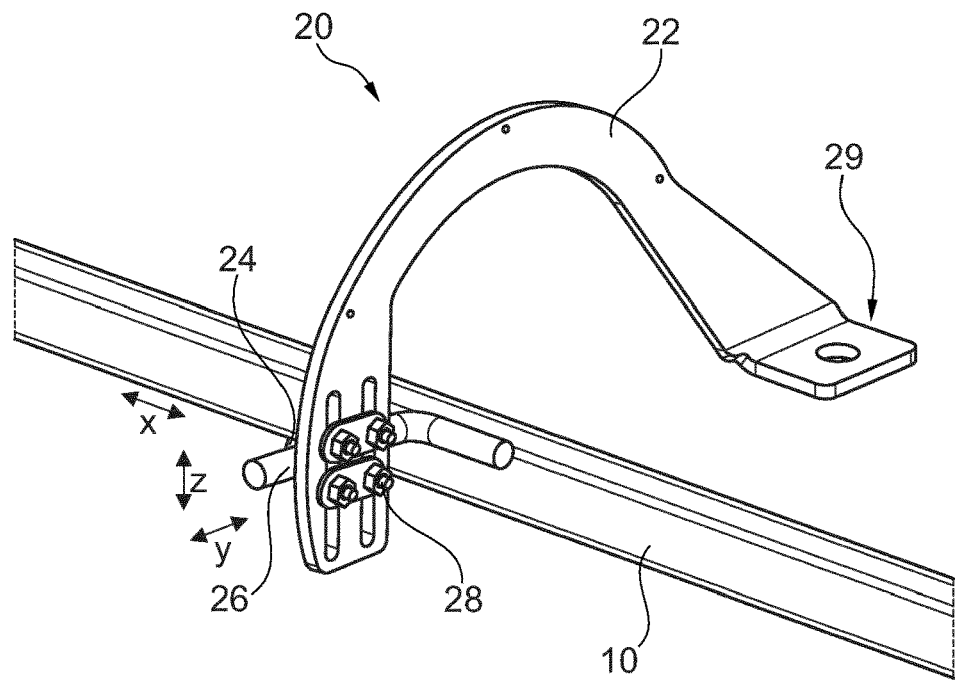

The rail 10 further includes rail mounts (attachment elements) for attaching the rail to a supporting structure or for joining them to one another with connectors. FIGS. 4 and 5 show an example embodiment of a rail mount 20 for a rail 10 having an L-shaped cross section.

The rail mount 20 comprises a mounting bracket 22. On one end portion, the mounting bracket 22 is attached to the rail 10 by a mount clamp 24: The mount clamp 24 is formed as 2 u-shaped clamp elements which are clamped, through vertically slotted holes provided in the rail mount 20, to a rail mount rod 26 fixed to the rail 10. The slotted holes of the mounting bracket 22 allow vertical adjustment of the rail position. For fixing the connection between the mount clamp 24 and the rail mount rod 26, a nut 28 is provided to tighten the clamp.

The other end portion of the mounting bracket 22 is shaped and provided with an attachment system 29 for attaching the other end portion of the mounting bracket 22 to a supporting structure, i.e., a stationary installation of the industrial site. The intermediate portion of the mounting bracket 22 between these two end portions includes a metal sheet. This sheet is oriented such that it is stiff in a direction perpendicular to the rail but has more flexibility in the direction along the rail.

This rail mount 20 requires a small number of parts, is simple and cost-efficient, and still allows for finely adjusting the rail position during installation.

Figure 8:
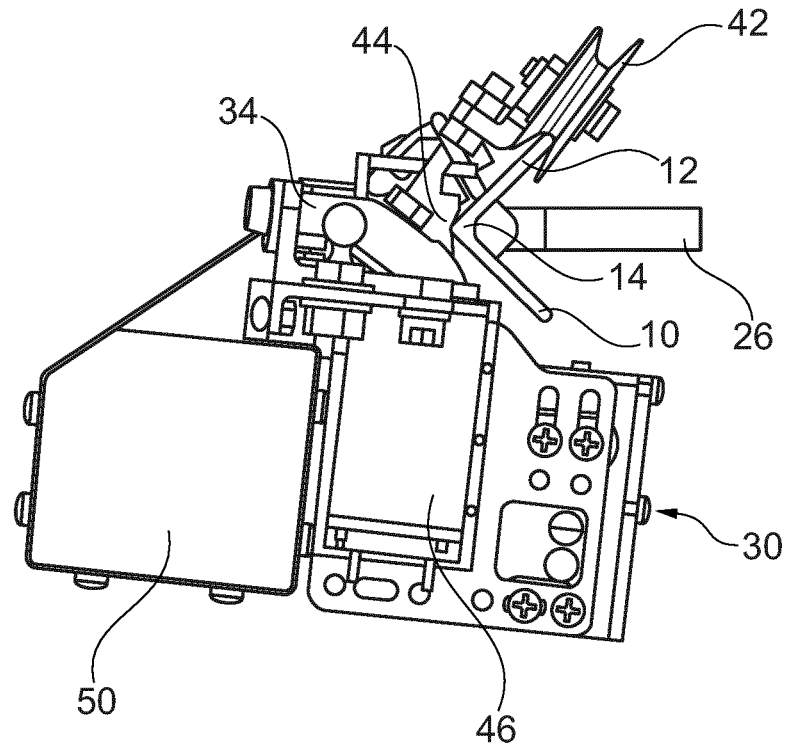
FIGS. 8 and 9 are cross-sectional views of a rail vehicle system according to a further embodiment of the invention.
Figure 9:
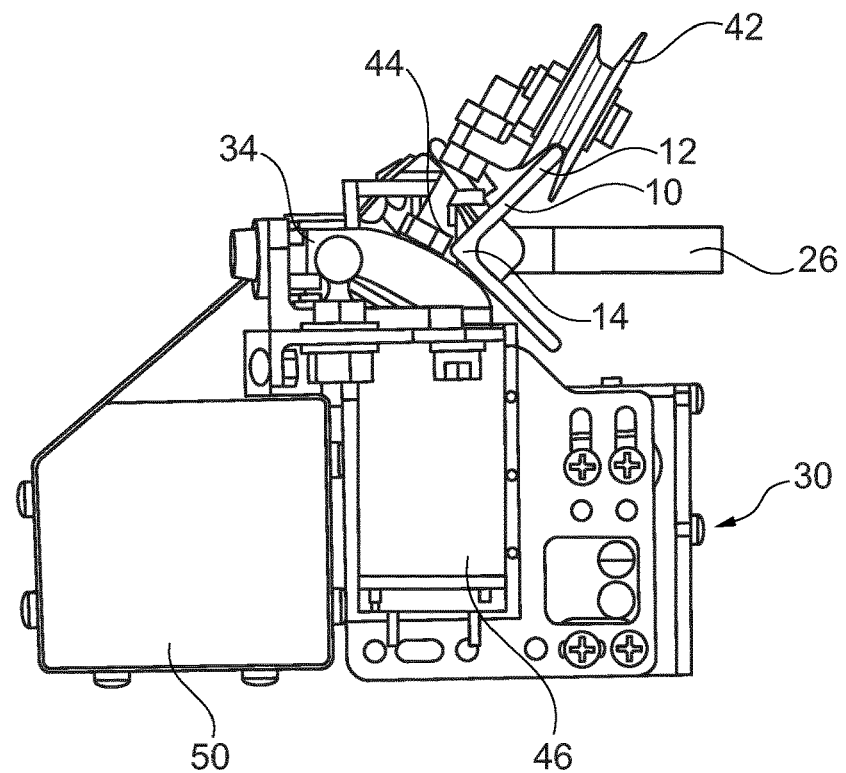

FIGS. 8 to 9 show views of a further rail vehicle system 1 according to an embodiment of the invention. Therein, the same reference signs as in the previous Figures are used, and the description of the previous Figures applies here as well.

As shown in FIGS. 8 and 9, the rail 10 is L-shaped with two legs of similar length and an angle of approximately 45° with respect to the vertical for the upper leg, and of approximately 45° with respect to the horizontal for the lower leg.

The inclination angle of the vehicle 30 relative to the rail can be adjusted by adjusting the position of the carry rollers 42 or the support rollers 44 or both. The inclination angle is slightly different in FIG. 9 than in FIG. 8.

Figure 10:
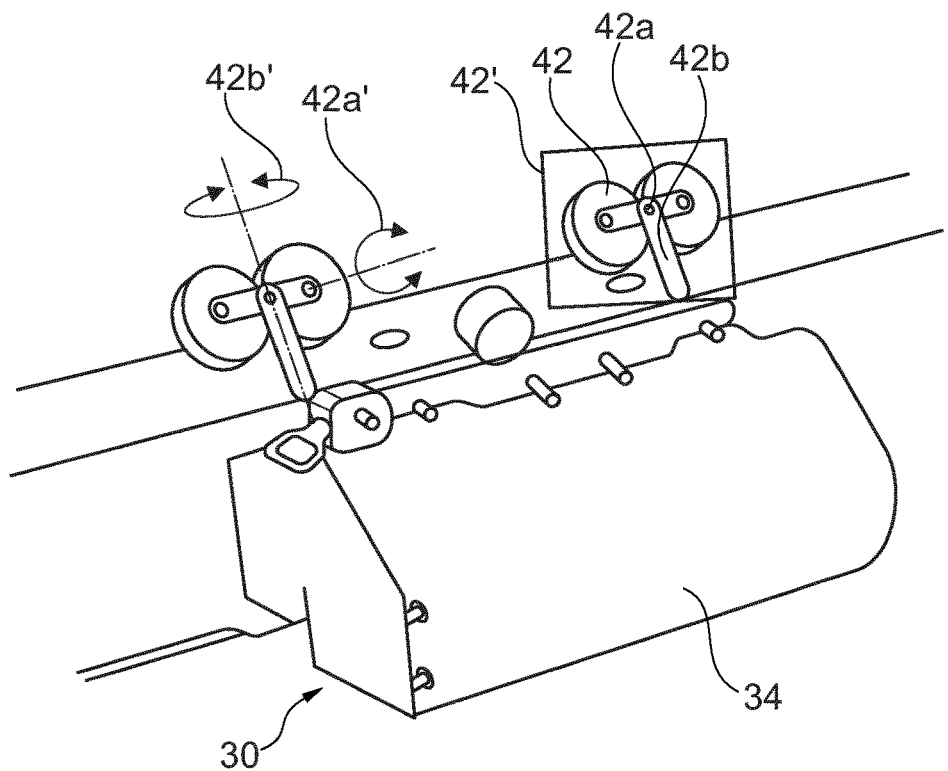
FIG. 10 is a perspective view of the rail vehicle system of FIGS. 8 and 9.

FIG. 10 shows that the carry rollers 42 are provided pairwise, so that at least two pairs 42' of carry rollers 42 (twin rollers 42') are attached to the chassis 34. The twin rollers 42' are jointly mounted on a hinge 42a that can rotate axially, as illustrated by the arrows 42a', for running vertical curves. The twin rollers 42' are, furthermore, mounted on a swivel member 42b that can rotate in a direction perpendicular to the axis and to the line connecting the roller centers, as illustrated by the arrows 42b'; this allows turning of the twin idlers in horizontal curves. The carry rollers 42 are idlers.

Likewise, the support rollers 44 (possibly also idlers, not shown in FIG. 10) are mounted on a rocker that pivots vertically; this enables that both support idlers push onto the rail with approximately equal force.

The carry rollers 42 are vertically aligned; this prevents rolling motion of the car when going through horizontal curves. Likewise, the support rollers 44 may also be vertically aligned.

The rollers 42 or 44 may have an elastic surface to absorb and dampen vibrations from running over a rough rail surface The support rollers 44 comprise traction rollers which have an elastic and sticky coating, to produce high traction force against the rail without slipping.

In a particular advantageous mode of the invention, the support rollers 44 also act as traction rollers as described herein, and preferably roll on the lateral rail side 14 being an outer edge or bend of an L-shaped side edge of the rail 10 (i.e., at the outer intersection of a first and second rail legs 16, 18 of the rail 10). This configuration allows for a particularly good traction of the traction rollers, and thus allows for reliable traction even under difficult conditions. The traction is, in particular, due to the location of the center of gravity 32 of the rail vehicle 30, is vertically below the upper rail side 12 and laterally displaced with respect to the upper rail side 12, due to the at least one support roller 44 rolling against the lateral rail side 14. The force pressing the traction roller 44 onto the rail side 14 (and thereby the traction) increases with increasing lateral and downward displacement of the center of gravity 32 from the upper rail side 12, because the center of gravity acts as a lever pressing the traction roller 44 onto the rail side 14.

Figure 11:
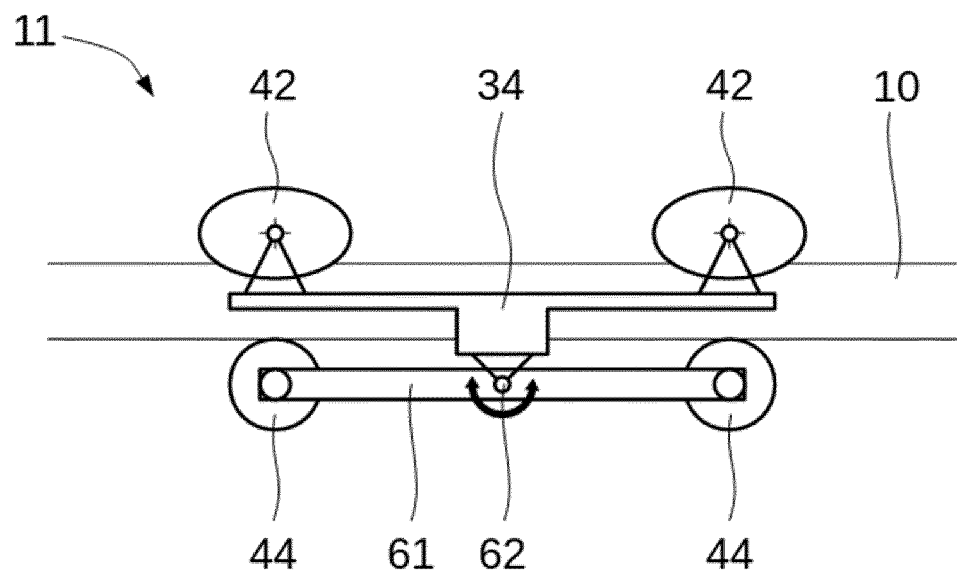
FIG. 11 is a top view of a rail vehicle system according to a further embodiment of the invention.

FIG. 11 is a top view of a rail vehicle system according to a further embodiment of the invention. This embodiment corresponds to the embodiment of FIG. 1 with two carry rollers 42 and two support rollers 44. The chassis 34 is shown only schematically. The two support rollers 44 are mounted on a rocker 61. The rocker 61 is rigid and is pivotably mounted to the chassis 34 by a pivot joint 62, as indicated by the double arrow at the pivot joint 62. The pivot joint 62 is arranged between the two support rollers 44. The pivot joint 62 defines a swivel axis for pivoting the rocker 62 with respect to the chassis 34. The swivel axis is parallel to the axes of the support rollers 44. The carry rollers 42 are rigidly (rotatably about their axes) mounted to the chassis 34. FIG. 11 shows the rocker 62 in a neutral pivot position; in this position each of the support rollers 44 is arranged vertically below a respective one of the carry rollers 42.

This arrangement allows a respective alignment of respective pairs of one of the carry roller 42 and one of the support roller 44, such that that their respective axes intersect and both lie on a vertical plane. This arrangement improves the vehicle's ability to keep a constant roll angle even when moving through vertical curves. At the same time, this design improves the vehicle's ability to have a consistent contact of all wheels of the vehicle with the rail with a well-balanced (horizontal) contact force of the rollers, especially of the support rollers 44. Further, this design allows an equal distribution of the traction force transmitted by the support rollers 44, and thereby improves overall traction performance of the vehicle, even when the vehicle enters or exits curves or moves up a ramp.

Alternatively or in addition, also the carry rollers 42 may be mounted in an analogous manner on a rocker, the rocker being pivotably mounted to the chassis 34 by a pivot joint. With this option, the above description applies with the support rollers and carry rollers being interchanged.

As another alternative, the carry rollers 42 and/or the support rollers 44 may be supported by individual suspensions. As another variation of any of these alternatives, the carry rollers 42 and/or the support rollers 44 may be replaced by pairs of rollers as shown in FIG. 10.

As an example, a specific purpose of the rail vehicle according to an embodiment is the automatic inspection of rollers of conveyors. Rollers of conveyors carry the belt and the material on the belt. Long typical mining conveyors can have many thousands such rollers. Additionally there are return rollers that support the returning part of the belt.

To perform such an inspection automatically the vehicle is equipped with sensors for inspection, preferably with at least one of the following: microphone, thermal camera, visual camera. Additionally the vehicle is equipped for positioning itself with respect to the rail or the rollers. For this purpose the vehicle has at least one of the following: a positioning encoder (82) that rolls with a measuring wheel on the rail; a sensor system that detects reference points which are fixed on the rail; a sensor system (e.g., a computer vision system, ultrasonic distance sensors, optical/laser distance sensors, radar sensors) that detects the actual rollers or roller sets or other regular mechanical features of the conveyor installation which allow the vehicle to position itself relative to the rollers.

Furthermore for automatically performing inspection tours the vehicle includes a motion program which defines the motion of the vehicle. The program has instructions to control positioning of the vehicles' inspection sensors relative to the rollers or the rail or both.

The above is just one example, and the invention is not limited to a particular industrial site. Preferably, the industrial site includes an industrial processing or extraction site (such as a plant, refinery, mining operation). General infrastructure systems such as public transport systems are not considered to be an industrial site, and public transport systems are not primarily used for surveillance, inspection, and/or maintenance.

Depending on the industrial site and on the specific purpose of the rail vehicle system (e.g., surveillance, inspection, and/or maintenance operations, such as the inspection of rollers of conveyors as described in the above example), the vehicle system may have various ones of the functionalities described herein.

In case of a plurality of functionalities, one vehicle may have multiple functionalities, or for each functionality a separate vehicle may be provided. Thus, there may be a plurality of vehicles including at least one pair of vehicles having different functionalities. The different functionalities may serve different purposes or may serve the same purpose by different means.

The multiple vehicles may be driven independently from each other for moving separately along the rail. Alternatively, the multiple vehicles may be coupled to each other for moving jointly along the rail.

The presence of multiple vehicles may allow at least one of the following: performing the same operation fast with one vehicle, and slower and more thoroughly with another vehicle; or performing service operation on the vehicle system (e.g., clean the rail, clean another vehicle, tow a damaged vehicle, refuel/recharge another vehicle).

In the example application of the rail vehicle system for inspecting rollers of conveyors, there may be provided at least one of the following functionalities: Inspection of the rollers, tagging of rollers, e.g., with a shot of marking paint, inspection of belt alignment, measurement of environmental conditions (air temperature, wind, dust concentration, gas concentrations, rain amount, radiation, . . . ). These functionalities may be provided in a single vehicle or (overlapping or non-overlapping) groups of functionalities may be provided in separate respective vehicles. For example, one rail vehicle may be equipped for inspecting rollers, another rail vehicle may be equipped for tagging rollers, and yet another rail vehicle may be equipped for cleaning the rail.

In another example, one rail vehicle may be a fast inspection vehicle that runs continuously and is equipped for recording data from rollers while passing by, and another inspection vehicle equipped with more advanced inspection capabilities may be configured for stopping at an inspection roller (e.g., at an inspection roller that was found to show signs of degradation by the fast inspection vehicle) and for inspecting that roller thoroughly.

GENERAL ASPECTS OF THE INVENTION

In the following, further aspects of the invention are described. Each aspect can be combined with any other aspect or part of embodiment described herein. In the description of these aspects, the reference numbers of the above-described embodiments are used for corresponding parts. This is not meant as a limitation; instead these aspects can be used also independently of these embodiments.

The rail vehicle 30 may have at least some of the following parts and properties:

The rail vehicle 30 has a rigid frame or chassis 34 or comprises a sequence of rigid frames or chasses coupled to each other via a coupling 39 (coupling elements) to form a train. Thus, the train may have a plurality of cars 31a, 31b, each of the cars 31a, 31b having a rigid frame or chassis 34.

The rail vehicle 30 has two carry rollers 42 connected to the chassis or chasses 34. The carry rollers 42 have a groove along their outer circumference. The groove engages on an upper rail side 12 of the rail 10 (upper edge of the rail). Due to this engagement, the carry rollers 42 ride on the upper side of the rail and that carry the weight of the vehicle, and also guide the rail vehicle 30 along the rail 10, regardless of whether the track is straight or curved.

The rail vehicle's center of gravity 32 is vertically below the upper side (edge) 12 of the rail 10. Thereby, the engagement of the groove on the upper rail side 12 is stabilized by the rail vehicle's weight. The vertical distance of the center of gravity 32 from the upper side 12 of the rail 10 may be at least 2 times the vertical distance of the support roller 44 from the carry rollers 42.

The rail vehicle 30 has two support rollers 44 that ride on a lateral rail side 14 of the rail 10 (opposite to the mount 20).

The rail vehicle's center of gravity 32 is laterally (horizontally) offset or displaced with respect to the rail 10 (e.g., with respect to the vertical line through the upper side or edge 12 of the rail, as shown in FIG. 1*b*). This lateral displacement is a result of the two support rollers 44 pushing the rail vehicle 30 sideways due to a vertical force component exerted by the rollers 34 on the lateral rail side 14. The lateral displacement (horizontal distance) of the center of gravity 32 from the upper side 12 of the rail 10 may be at least 1.5 times or even 2 times the horizontal distance of the support roller 44 from the carry rollers 42.

The rail vehicle 30 has an actuated brake system that acts on either the rail or the rollers 42 or 44.

The rail vehicle 30 has a traction system including one or more electric traction motors 46 that act on either the support rollers 44 or the carry rollers 42 or both. Thus, at least one of the support rollers 44 and the carry rollers 42 is powered; the remaining rollers may be idling. Thus, the rail vehicle 30 is self-propelled. Preferably, the at least one support roller 44 is the traction wheel actuated by a traction motor 46.

The rail vehicle 30 has a navigation/positioning system. The navigation/positioning system may include a sensor system 82 for measuring travel distance or position, such as an optical tracking system for reading optical markers in the environment or on the rail 10; a GPS system; a wheel-based distance measuring system, or a combination thereof.

The sensor system includes at least one of a positioning encoder (82) that rolls with a measuring wheel on the rail, and a sensor system that detects a reference point fixed on the rail. The sensor system may include at least one of a computer vision system, an ultrasonic distance sensor, an optical distance sensor, a laser distance sensor, and a radar sensor.

The rail vehicle 30 has a functional module 50 for carrying out the surveillance, inspection, and/or maintenance of the industrial site. The functional module 50 may include process equipment such as an inspection camera, a sensor, a manipulator, or the like. The functional module 50 may have at least one of a computer vision system, an ultrasonic distance sensor, an optical distance sensor, a laser distance sensor, and a radar sensor. Further, the functional module 50 may include a rail inspection system, a vehicle inspection system, an industrial equipment inspection system, a rail cleanup system (e.g., for removal of snow, debris, or other disturbances from the rail), a tagging system).

Also, multiple vehicles may be provided in the rail vehicle system, with at least two vehicles having a different set of functionalities.

The rail vehicle 30 has a rechargeable power source operatively connected to the traction system, the navigation system, and/or the functional module.

The rail vehicle 30 has a terminal connectable to an external port. The terminal may be connected to the rechargeable power source for recharging the rechargeable power source by electrical power supplied from the external port, and/or be connected to a control unit of the rail vehicle for allowing data exchange between the control unit and an external data port.

A center-of-gravity angle 4 is at least 5°, more preferably at least 10°, more preferably at least 20°, and even more preferably at least 30°, and/or at most 45°, at at least one position along the rail 10.

A support-roller-contact angle 5, is at least 5°, more preferably at least 10°, more preferably at least 15°, and even more preferably at least 20°, and/or at most 45°.

The support wheels 44 transmit a horizontal force component to the rail portion 14 which is created by the center of gravity 32 being horizontally offset with respect to the upper edge 12.

The carry wheels 42 are rigid (e.g., comprising steel) and may have a circumferential slit for receiving the upper rail portion 12.

The support wheel 44 may be a traction wheel connected with traction motor 46 for driving the support wheel. Alternatively, an additional traction wheel may be provided. The traction wheel may produce traction forces either through positive locking (rack drive) or through friction with the rail or both.

The vehicle has no other contact points with the rail other than the (preferably two) support wheels and the (preferably one) traction wheel, and an optional brake and/or other non-permanent contact points.

The center of gravity 32 of the vehicle 30 is below and offset to the side of the carrying wheels 42; and this offset results in a horizontal force component which presses the support wheel 44 to the rail 10.

The support roller 44 is vertically below the carry rollers 42.

The support roller 44 has a different axis of rotation than the carry rollers 42, the axis of rotation of the support roller having preferably a smaller angle with respect to the vertical than the carry rollers 42.

The rail vehicle is unmanned and self-propelled. In particular, being unmanned, the device is not dimensioned, equipped or rated for transport of a human driver or passenger. This allows a small and lightweight construction in accordance with the rail vehicle's purpose of for surveillance, inspection and/or maintenance.

The rail vehicle is a train-like vehicle system with at least one self-propelled traction vehicle and at least one, possibly idling, coach vehicle with process equipment and coupled to the traction vehicle by a coupling that transmits push and pull forces and that allows the train-like vehicle system to go through horizontal and vertical curves.

The process equipment is electrically powered by a power source comprised in the vehicle The position of the carry rollers 42 or the support rollers 44 or both is fine-adjustable to adjust the roll-angle of the vehicle 30.

The carry rollers 42 comprise twin idlers mounted on a hinge that can rotate axially for running vertical curves, and mounted on a swivel member that can rotate perpendicular for turning of the twin idlers in horizontal curves.

The support rollers are mounted on a rocker that is able to pivot vertically for enabling both support rollers to push onto the rail.

The support rollers (traction rollers) or carrying rollers or both have an elastic surface to absorb and dampen vibrations.

The traction rollers have an elastic and sticky coating.

The support rollers (traction rollers) or carrying rollers are replaceably mounted.

The carry rollers 42 are provided pairwise, each pair 42' being optionally jointly mounted on a hinge 42a that can rotate axially and optionally jointly mounted on a swivel member 42b that can rotate in a direction perpendicular to the axis and to the line connecting the roller centers.

The support roller 44 is provided as a pair of rollers, optionally jointly mounted on a rocker that pivots vertically.

The carry rollers 42 are vertically aligned.

The support rollers 44 are vertically aligned.

The carry rollers and/or the support rollers have an elastic surface.

The rail vehicle may have a network interface for transmitting data to/from a control center (either directly through a communications link, or indirectly via the base station discussed below). The control center may be located at the industrial site or may be located remotely from the industrial site. The control center may also be a cloud-based system connected to the network.

The base station 90 may have at least some of the following parts and properties:

The base station 90 is fixed relative to the rail, in such a position that the connection port is connectable to the rail vehicle's terminal by moving the rail vehicle 30 to the base station 90.

The base station 90 has a data connection to a stationary control center for exchanging data with the control center.

The base station 90 is supplied with electrical power, e.g., from a power grid. The base station 90 may have an emergency power supply or storage.

The rail vehicle system has at least one base station, optionally a plurality of base stations, arranged along a rail.

The rail passes through or ends at a base station.

The base station is adapted for charging a power source (battery) of the rail vehicle (e.g., by contact or contactless charging).

The base station is adapted for transferring data from the vehicle to the base station. Alternatively or in addition, the base station may be adapted for transferring data and instructions to the rail vehicle (e.g., a program with instructions about how and when to carry out operations).

The base station has housing (garage) for accommodating and/or sheltering the rail vehicle. The housing may have a roof. The housing may optionally have side walls, curtains, doors and/or covers for the vehicle to pass through. The housing has an opening through which the rail passes into an inside of the housing allowing the vehicle to enter and/or exit the housing. The base station may comprise a door for closing the opening at least partially. The housing may have an installation for repelling wildlife (birds, insects, . . . ).

The base station comprises a wash bay for cleaning the rail vehicle.

The base station comprises a sensor (e.g., optical sensor) for performing a visual and/or functional check of the rail vehicle when the vehicle is at the base station. The sensor may include at least one of a camera, light sensor, distance sensor. The sensor may be adapted for visual and functional checks of the rail vehicle.

The base station comprises a stopper for bringing the rail vehicle to a controlled stop within the base station. The rail vehicle may have a positioning system adapted for calibrating a position of the rail vehicle when the rail vehicle is engaged with the stopper. The stopper may include a proximity element allowing detection of the rail vehicle's proximity, and a circuitry for sending a stop command to the rail vehicle in response to a detected proximity (e.g., activation of a proximity switch). The proximity element may include a proximity switch and/or magnet at the base station which triggers a switch on the vehicle.

The base station comprises a vibration sensor (e.g., sonic sensor) attached to the rail, and have a readout circuitry attached to the vibration sensor for detecting motion of the rail vehicle on the rail even when the vehicle is away from the base station.

The base station comprises a battery charger for a battery of the rail vehicle, the battery charger including a battery charge status determining circuit for determining a charge status/charge level of the battery.

The base station comprises a weather sensor.

The base station comprises a proximity sensor for determining a distance and/or a proximity of the vehicle with respect to the base station.

The base station has a base station controller to control the logic and behavior of any one or more of the sensors and functional elements of the base station mentioned herein.

The base station has a network interface adapted for transferring data to a control center (e.g., a local computer or remote computer, possibly a cloud-based computer system), e.g., for further processing of the data and/or for cloud access to the data.

The data may include status information about the base station and/or the vehicle. The status information may include information about at least one of the following: if the vehicle is inside the base station or not, status and sensory information from battery charger, wash bay element, weather sensor, proximity sensor, and/or any other sensor of the base station.

The network interface may provide remote network access to a base station controller of the base station from a remote host, e.g., on operating system level or application level. Similarly, the network interface may also allow access to the base a vehicle controller of the rail vehicle.

The data network may be a TCP/IP network such as Internet. The network interface may be operatively connected to the data network for carrying out commands received from the data network. The commands may include a control command for controlling the base station and/or the rail vehicle to carry out a task such as motion or stopping of the rail vehicle. In this case, the base station and/or rail vehicle is adapted for carrying out the task in response to the control command. The commands may include a status request. In response to the status request, or without prior status request, the base station or rail vehicle may be adapted for sending a status information to the network interface, and the network interface is then adapted for sending the status information over the network. The commands may include an update command including update data. In this case, the device/controller is adapted for initiating an update in response to the update command and using the update data.

The network may be an Ethernet network using TCP/IP such as LAN, WAN or Internet. The data network may comprise distributed storage units such as Cloud. Depending on the application, the Cloud can be in form of public, private, hybrid or community Cloud.

The base station 90 may have a port (data connection port and/or power port) having at least some of the following parts and properties:

The port is connectable to the rail vehicle's (charging and/or data) terminal 92, for recharging the rail vehicle's power source and/or for exchanging data.

The base station 90 has a data port 96, and the rail vehicle 30 has a data terminal 94 connectable to the data port 96 for exchanging data between the base station 90 and a rail vehicle's control unit 80. The base station 90, more precisely the data port 96 (and the rail vehicle's data terminal 94) may have a wireless interface for exchanging the data wirelessly.

The vehicle's (data or charging) terminal has (data or charging) contacts that are blade-shaped.

The (data or charging) port 96, 98 has (data or charging) contacts are provided with a mechanical guide allowing the rail vehicle to drive into and out of the contacts with its own propulsion, without need for additional contact actuation.

The mechanical guide has a mechanical alignment element for compensating for mechanical offsets between the contacts at the vehicle and at the base station.

The (data or charging) port 96, 98 is arranged for cleaning the blade shaped terminal contact upon engagement.

The port 96, 98 has a pair of contact portions facing each other for contacting the terminal's contact therebetween.

The port 96, 98 has at least one chamfered entry section allowing a blade-shaped charging contact to align with the power port when the vehicle docks for charging and/or data transfer.

The port is mounted on a flexible suspension of the base station.

The terminal and/or port comprise at least one contact/contact portion, respectively, possibly a plurality of respective contacts/contact portions. The at least one contact/contact portion may comprise silver (e.g., a silver coating) for providing good electrical conductivity even when the surfaces oxidize.

The charging terminal and power port may be an integrated charging and data terminal and port for both charging and data transmission through the same contacts.

The charging terminal and power port are contactless for contactless power transfer and/or contactless (electrical) charging of the vehicle's power source.

The data connection port and data terminal are contactless for contactless data transfer (e.g., by electromagnetic waves).

The rail 10 may have at least some of the following parts and properties:

The rail 10 has an upper rail side 12 for engaging with the carry rollers 42, and a lateral rail side 14 for supporting the support rollers 44, thereby laterally displacing the center of gravity 32 of the rail vehicle 30. The upper rail side 12 is an upper rim on which the carry rollers 42 roll along the lengthwise direction, and is optionally rounded.

The rail includes individual rail segments.

The rail 10 has straight, horizontally curved, vertically curved, and/or inclined rail segments coupled to each other.

The rail segments have connectors (such as a joining shape or joining elements) at both ends form-fit to each other for joining the ends to one another for assembling multiple segments to a longer rail. For example, the connectors may include an aligning structure for align mating ends vertically and horizontally.

The upper edge 12 and/or the lateral rail side 14 is rounded.

The lateral rail side 14 has a ribbing or friction-increasing coating to increase traction or prevent slip.

The rail has embedded markers (optical, magnetic, tactile) for a sensor installed on the vehicle to measure the distance traveled.

The rail has cut-outs to reduce weight. These cut-outs may also serve as mounting features for the rail.

The rail has tooth-like features that allow rack and pinion drive traction of the vehicle.

The rail has markers or cutouts that serve as reference marks for the travel distance of the vehicle.

At least one section of the rail 10 has a slope of more than 15° along the rail with respect to the horizontal, so that the rail vehicle running along the rail climbs the slope of more than 15°. The slope may be nowhere more than 40° along the rail, preferably at most 30°.

In a cross-sectional view in an orthogonal plane to the lengthwise direction of the rail (at at least one position of the rail), the rail may have at least some of the following properties:

The rail has a more inclined upper portion and a less inclined or essentially vertical lower portion.

The rail 10 cross-section extends, at least in a portion below the upper rim 12, in a predominantly vertical direction with an inclination of less than 45°, preferably less than 30° with respect to the vertical.

The rail cross-section is L-shaped with two legs (first leg 16 and a second leg 18) arranged at an angle of approximately 90° (e.g., between 60° and 120°, preferably 75° and 105°) with respect to each other.

In the rail cross-section, the first leg extends from the second leg in an upward direction, i.e., at an upward angle, i.e., at an (absolute) angle of less than 90° from the vertical. The angle of the first leg from the vertical in the rail cross-section is preferably at most 75°, and more preferably at most 60°. The angle is preferably at least 15°, and more preferably at least 30°.

The first and the second leg may have essentially the same length, up to a tolerance of 30% of the first leg length.

The first leg 16 may be a long leg, the second leg 18 may be a short leg.

The first leg 16 may point approximately—with a tolerance of up to 45°, in embodiments of up to 30°—upwards.

The second leg 18 may point generally horizontally or downwards at an angle of up to 75° with the horizontal.

The upper rail side 12 may be formed by an upper edge of the first leg 16.

The lateral rail side 14 is a side edge of the second leg 18. The side edge of the rail 10 may be an edge at the outer intersection of first and second rail legs 16, 18.

The upper rail side 12 may be an upper or side edge of the rail 10.

The upper rail edge may be an upper end of the cross-sectional profile.

The lateral rail side 14 is a side edge of the rail 10.

The long leg 16 is pointing upwards, preferably at an angle between 45° and 90° with respect to the horizontal or between 135° and 90° with respect to the vertical axis.

The long leg 16 is inclined with respect to the vertical by an inclination angle of less than 45°, preferably less than 30° or even less than 20°.

The short leg 18 is pointing downwards, preferably at an angle between 0 and 75°, to the horizontal.

The rail cross-section is L-shaped for a straight or a curve with larger radius; and is vertically straight for a curve with smaller radius.

The rail cross-section contains bends for stiffening the rail, such as a stiffening bend, zig-zag bends, and/or a backfold.

The lateral rail side portion 14 at which the at least one support roller 44 contacts the lateral rail side is offset by a support-roller-contact angle 5 of at least 10°, in embodiments at least 15°, from the vertical line below the upper rail side 12, the support-roller-contact angle being the angle between the vertical line below the upper rail side 12 and the straight line connecting the upper rail side 12 and the lateral rail side portion 14, in a cross-sectional plane orthogonal to the length direction of the rail 10.

The rail 10 may have at least some of the following aspects related to the rail material:

The rail 10 comprises metal or is essentially made of metal (but may additionally comprise a non-metal layer).

The rail 10 comprises steel, preferably a steel sheet (e.g., steel band).

The rail is made from flat stock and bent to L-shape

The rail is rolled at L-shape (hot rolled or cold rolled)

The rail is made of stainless steel

The rail is made by a hot or cold rolling process

The rail comprises aluminum.

The rail is extruded with L-shape.

The rail comprises a non-metal (e.g., Nylon, PVC, fiberglass, . . . ) or is made of a non-metal.

The rail is made from extruded non-metal/polymer material

The rail has a hydrophobic coating to avoid dirt and dust accumulation

The L-shaped section may be made from a non-metal/polymer, and/or the running surfaces may include a metal that is attached to the polymer material through rivets, adhesive or other means.

The rail has corrosion protection (such as paint or galvanized or anodized layer).

The rail mount 20 may have at least some of the following properties:

Multiple rail mounts are placed at intervals.

The rail mounts are adapted for attaching the rail to a supporting structure and/or for joining them to one another with connectors.

The rail mount comprises a mounting bracket, a mount clamp, and a rail mount rod.

The mounting bracket provides stiffness in a direction orthogonal to the rail but has more flexibility in the direction along the rail.

The mounting bracket 20 is a single part.

The mounting bracket 20 is made from sheet metal stock (steel or aluminum), and may be stamped or cut (e.g., with plasma/waterjet/ . . . ).

The mounting bracket 20 has a generic part and a custom part.

The generic part has 2+ vertically slotted holes for the mount clamp.

The custom part has a geometry that fits with the given structures where the mounting bracket is attached to, preferably multiple mounting brackets 20 have different custom parts.

The mount clamp clamps the rail mount rod to the mounting bracket and comprises at least two u-shaped rods and at least one nut per u-shape to tighten the clamp.

The slotted holes of the mounting bracket allow to adjust the rail position vertically.

The rail mount rod can slide horizontally within the mount clamp to adjust the rail position horizontally (in y-direction) before the clamp is tightened.

The slotted holes are wider than the rod diameter of the mount clamp, for allowing to tilt the rail mount rod up or down by some degrees to fine-adjust the angle of the rail about the horizontal direction.

The mounting bracket 20 is made from sheet metal stock (steel or aluminum), and is stamped or cut (e.g., with plasma or water-jet).

The mounting bracket 20 has bent features and/or a sheet orientation to stiffen it in a direction perpendicular to the rail but to allow more flexibility in a direction along the rail.

The mounting bracket 20 has an attachment structure for attaching a cover for the rail.

The mount clamp comprises 2 standard u-bolts and connecting washer plates.

The mount clamp comprises a single bent rod with threaded ends.

The nuts to tighten the mount clamp are lock-nuts.

The mounting bracket is attached to a given structure, e.g., by welding, nuts & bolts, or clamping.

The rail mount rod is attached to the rail, e.g., by welding, nuts & bolts, or clamping.

The rail mounts are magnetic on one end for a fast installation to the conveyor or for easy removal of the rail from the conveyor.

The rail mounts have mounting clips or other quick connection types that connect to the rail.

The rail mounts are adjustable or are designed to align the rail at angle with respect to the vertical axis.

The following aspects relate to preferred applications of the unmanned rail vehicle system:

The rail vehicle system is used for performing inspection of rollers of a conveyor, e.g., for a conveyor carrying a belt and material on the belt, such as a mining conveyor.

The rail vehicle is equipped with a sensor for inspection of a conveyor, preferably with at least one of the following: microphone, thermal camera, visual camera.

The vehicle has a navigation/positioning system and/or a functional module as described herein. The functional module may be adapted for detecting the rollers or roller sets or other regular mechanical features of the conveyor installation, and optionally allow the vehicle to position itself relative to the rollers.

The vehicle has a motion program which defines the motion of the vehicle. The program has instructions to control positioning of the vehicles' inspection sensors relative to the rollers or the rail or both.

The invention claimed is:

1. An unmanned rail vehicle for use in an industrial site, the rail vehicle comprising:
   a chassis;
   at least two carry rollers connected to the chassis and adapted for engaging on an upper rail side of a rail and for moving the rail vehicle along the rail, wherein a center of gravity of the rail vehicle is vertically below the upper rail side;
   at least one support roller connected to the chassis and adapted for rolling against a lateral rail side of the rail to laterally displace the center of gravity of the rail vehicle with respect to the upper rail side;
   at least one of a charging terminal and data terminal, the charging terminal being connectable to a power port of a base station for transmitting electrical power from the base station to a power source of the rail vehicle for charging the rail vehicle, the data terminal being connectable to a data port of the base station for transmitting data between the base station and a control unit of the rail vehicle,
   wherein the unmanned rail vehicle is not dimensioned, equipped, or rated for transport of a human driver or passenger.

2. The unmanned rail vehicle according to claim 1, having at least one of:
   at least one electric traction motor acting on at least one of the at least one support roller and the at least two carry rollers; or
   the power source being a rechargeable power source; or
   an actuated brake system that acts on at least one of the rail, the at least two carry rollers, and the at least one support roller; or a location sensor system for measuring travel distance or position; or a remote-controlled or autonomous motion control operatively coupled to the at least one electric traction motor acting on the at least one of the at least one support roller and the at least two carry rollers for controlling motion of the unmanned rail vehicle along the rail.

3. The unmanned rail vehicle according to claim 1, wherein the rail vehicle is self-propelled.

4. The unmanned rail vehicle according to claim 1, further comprising a functional module selected from the group including:
an inspection camera,
a sensor,
a manipulator, and
a combination of these.

5. The unmanned rail vehicle according to claim 1, wherein the at least one support roller is a traction wheel actuated by a traction motor.

6. The unmanned rail vehicle according to claim 1, wherein the chassis is rigid, and/or wherein the chassis is a plurality of rigid chasses coupled by a coupling for forming a plurality of cars of the rail vehicle.

7. The unmanned rail vehicle according to claim 2, wherein the rail vehicle is self-propelled.

8. The unmanned rail vehicle according to claim 2, further comprising a functional module selected from the group including:
an inspection camera,
a sensor,
a manipulator, and
a combination of these.

9. The unmanned rail vehicle according to claim 2, wherein the at least one support roller is a traction wheel actuated by a traction motor.

10. The unmanned rail vehicle according to claim 2, wherein the chassis is rigid, and/or wherein the chassis is a plurality of rigid chasses coupled by a coupling for forming a plurality of cars of the rail vehicle.

11. A rail vehicle system for use in an industrial site, the rail vehicle system comprising:
a rail vehicle having:
a chassis;
at least two carry rollers connected to the chassis and adapted for engaging on an upper rail side of a rail and for moving the rail vehicle along the rail, wherein a center of gravity of the rail vehicle is vertically below the upper rail side;
at least one support roller connected to the chassis and adapted for rolling against a lateral rail side of the rail to laterally displace the center of gravity of the rail vehicle with respect to the upper rail side;
wherein the rail vehicle is not dimensioned, equipped, or rated for transport of a human driver or passenger,
a rail having an upper rail side for engaging with the at least two carry rollers so that the center of gravity of the rail vehicle is vertically below the upper rail side, and a lateral rail side adapted for supporting the at least one support roller for laterally displacing the center of gravity of the rail vehicle with respect to the upper rail side, and
at least one stationary base station,
wherein at least one of:
(a) the rail vehicle has a charging terminal, and the base station has a power port, the charging terminal being connectable to the power port for transmitting electrical power from the base station to a power source of the rail vehicle for charging the rail vehicle, and
(b) the rail vehicle has a data terminal, and the base station has a data port, the data terminal being connectable to the data port for transmitting data between the base station and a control unit of the rail vehicle.

12. The rail vehicle system according to claim 11, wherein, in a cross-sectional view of at least a portion of the rail, the upper rail side is an upper edge of the rail.

13. The rail vehicle system according to claim 11, wherein at least one section of the rail has a slope of >15° along the rail with respect to the horizontal.

14. The rail vehicle system according to claim 11, wherein at, at least one position along the rail, the center of gravity of the rail vehicle, when mounted on the rail, is offset by a center-of-gravity angle of at least 10°, the center-of-gravity angle being an angle between a vertical line below the upper rail side and a straight line connecting the upper rail side and the center of gravity, in a cross-sectional plane orthogonal to a length direction of the rail.

15. The rail vehicle system according to claim 11, wherein at at least one position along the rail, a lateral rail side portion at which the at least one support roller contacts the lateral rail side is offset by a support-roller-contact angle of at least 10° from a vertical line below the upper rail side, the support-roller-contact angle being an angle between the vertical line below the upper rail side and a straight line connecting the upper rail side and the lateral rail side portion, in a cross-sectional plane orthogonal to a length direction of the rail.

16. The rail vehicle system according to claim 11, wherein the rail has an L-shaped cross section having
a first leg pointing approximately upwards, the upper rail side being formed by an upper edge of the first leg, and
a second leg pointing generally horizontally or downwards at an angle of up to 75° with the horizontal.

17. The rail vehicle system according to claim 11, wherein at least one of the rail vehicle and the base station include a network interface for connecting to a data network, wherein the at least one of the rail vehicle and the base station is operatively connected to the network interface for at least one of carrying out a command received from the data network and sending device status information to the data network.

18. The rail vehicle system according to claim 17, wherein the network interface is configured to transceive digital data between the network interface and the data network, wherein the digital data includes at least one of an operational command and device information about the rail vehicle, the base station, or the data network.

19. The rail vehicle system according to claim 11, wherein, in a cross-sectional view of at least a portion of the rail, the lateral rail side is a side edge of the rail.

20. Use of an unmanned rail vehicle for moving the unmanned rail vehicle along a rail, the unmanned rail vehicle including:
a chassis;
at least two carry rollers connected to the chassis and adapted for engaging on an upper rail side of a rail and for moving the rail vehicle along the rail, wherein a center of gravity of the rail vehicle is vertically below the upper rail side;
at least one support roller connected to the chassis and adapted for rolling against a lateral rail side of the rail to laterally displace the center of gravity of the rail vehicle with respect to the upper rail side;

at least one of a charging terminal and a data terminal, the charging terminal being connectable to a power port of a base station for transmitting electrical power from the base station to a power source of the rail vehicle for charging the rail vehicle, the data terminal being connectable to a data port of the base station for transmitting data between the base station and a control unit of the rail vehicle, and wherein the unmanned rail vehicle is not dimensioned, equipped, or rated for transport of a human driver or passenger;

wherein the rail has an upper rail side and a lateral rail side, wherein the upper rail side is used for engaging with the at least two carry rollers so that the center of gravity of the rail vehicle is vertically below the upper rail side, and wherein the lateral rail side is used for supporting the at least one support roller for laterally displacing the center of gravity of the rail vehicle with respect to the upper rail side.

\* \* \* \* \*